(12) United States Patent
Rome et al.

(10) Patent No.: US 11,176,553 B2
(45) Date of Patent: Nov. 16, 2021

(54) METHOD AND SYSTEM PROVIDING PEER EFFORT-BASED VALIDATION

(71) Applicant: Intensity Analytics Corporation, Warrenton, VA (US)

(72) Inventors: John D. Rome, Warrenton, VA (US); Bethann G. Rome, Warrenton, VA (US); Thomas E. Ketcham, II, Warrenton, VA (US)

(73) Assignee: Intensity Analytics Corporation, Warrenton, VA (US)

( * ) Notice: Subject to any disclaimer, the term of this patent is extended or adjusted under 35 U.S.C. 154(b) by 0 days.

(21) Appl. No.: 16/159,533

(22) Filed: Oct. 12, 2018

(65) Prior Publication Data

US 2019/0114636 A1   Apr. 18, 2019

Related U.S. Application Data

(60) Provisional application No. 62/572,366, filed on Oct. 13, 2017.

(51) Int. Cl.
*G06Q 20/40* (2012.01)
*G06Q 20/38* (2012.01)
(Continued)

(52) U.S. Cl.
CPC ..... *G06Q 20/4014* (2013.01); *G06F 3/04883* (2013.01); *G06F 16/1824* (2019.01);
(Continued)

(58) Field of Classification Search
CPC .............. G06Q 20/4014; G06F 21/33
See application file for complete search history.

(56) References Cited

U.S. PATENT DOCUMENTS

| 4,621,334 A | 11/1986 | Garcia |
| 4,805,222 A | 2/1989 | Young et al. |

(Continued)

FOREIGN PATENT DOCUMENTS

| GB | 2514780 A | * | 12/2014 | ....... G06Q 20/38215 |
| WO | WO-2014092534 A1 | * | 6/2014 | ............. G06F 21/33 |
| WO | WO-2019074686 A1 | * | 4/2019 | ........... G06Q 20/405 |

OTHER PUBLICATIONS

D. W. Kravitz, "Transaction Immutability and Reputation Traceability: Blockchain as a Platform for Access Controlled IoT and Human Interactivity," 2017 15th Annual Conference on Privacy, Security and Trust (PST), Calgary, AB, 2017, pp. 3-309, doi: 10.1109/PST.2017.00012. (Year: 2017).*

(Continued)

*Primary Examiner* — Jacob C. Coppola
(74) *Attorney, Agent, or Firm* — Schwegman Lundberg & Woessner, P.A.

(57) ABSTRACT

A method of performing a transaction between a first user of a first input device, and a second user of a second input device, the method includes generating, via the first input device, a transaction request with a with a first effort-based identity token associated with first user, receiving a response with the token and a validation key obtained from a validation server via the second input device based on a second effort-based identity token associated with the second user and a second user effort, providing the second user effort and second effort-based identity token to the validation server, receiving a second effort validation key from the validation server, and sending the transaction with the first user and second user identity-based tokens and first and second effort validation keys to the second person to complete the transaction while ensuring both the first and second users are consistent throughout the transaction.

20 Claims, 6 Drawing Sheets

(51) Int. Cl.
| | |
|---|---|
| *G06Q 20/32* | (2012.01) |
| *G06F 3/0488* | (2013.01) |
| *G06Q 20/10* | (2012.01) |
| *G06F 21/36* | (2013.01) |
| *H04L 29/06* | (2006.01) |
| *H04L 9/32* | (2006.01) |
| *G06Q 20/22* | (2012.01) |
| *G06F 21/33* | (2013.01) |
| *G06F 21/62* | (2013.01) |
| *G06F 16/27* | (2019.01) |
| *G06F 16/182* | (2019.01) |
| *G06K 7/14* | (2006.01) |
| *H04L 29/08* | (2006.01) |
| *H04L 9/08* | (2006.01) |
| *G06Q 20/02* | (2012.01) |
| *G06Q 20/24* | (2012.01) |

(52) U.S. Cl.
CPC .......... *G06F 16/1834* (2019.01); *G06F 16/27* (2019.01); *G06F 21/33* (2013.01); *G06F 21/36* (2013.01); *G06F 21/6245* (2013.01); *G06K 7/1417* (2013.01); *G06Q 20/02* (2013.01); *G06Q 20/10* (2013.01); *G06Q 20/223* (2013.01); *G06Q 20/24* (2013.01); *G06Q 20/3274* (2013.01); *G06Q 20/383* (2013.01); *G06Q 20/3829* (2013.01); *G06Q 20/401* (2013.01); *H04L 9/0861* (2013.01); *H04L 9/3213* (2013.01); *H04L 9/3271* (2013.01); *H04L 63/0414* (2013.01); *H04L 63/083* (2013.01); *H04L 63/0807* (2013.01); *H04L 63/0861* (2013.01); *H04L 63/102* (2013.01); *H04L 63/123* (2013.01); *H04L 67/22* (2013.01); *H04L 2209/38* (2013.01); *H04L 2463/102* (2013.01)

(56) References Cited

U.S. PATENT DOCUMENTS

| | | | |
|---|---|---|---|
| 5,557,686 | A | 9/1996 | Brown et al. |
| 6,151,593 | A | 11/2000 | Cho et al. |
| 6,442,692 | B1 | 8/2002 | Zilberman et al. |
| 8,732,158 | B1 | 5/2014 | Hundt |
| 9,078,128 | B2 * | 7/2015 | Medina ................. H04W 12/06 |
| 9,258,117 | B1 | 2/2016 | Roth et al. |
| 9,305,155 | B1 | 4/2016 | Vo et al. |
| 9,430,626 | B1 * | 8/2016 | Rome ................... G06F 21/316 |
| 9,576,285 | B2 * | 2/2017 | Zhou .................. G06Q 20/3278 |
| 9,882,918 | B1 * | 1/2018 | Ford ........................ H04L 63/14 |
| 10,235,507 | B1 * | 3/2019 | Rome ..................... G06F 21/46 |
| 10,396,985 | B1 | 8/2019 | Nagelberg et al. |
| 2004/0034788 | A1 | 2/2004 | Ross |
| 2004/0059950 | A1 | 3/2004 | Bender et al. |
| 2004/0187037 | A1 | 9/2004 | Checco |
| 2006/0280339 | A1 | 12/2006 | Cho |
| 2007/0045403 | A1 | 3/2007 | Slonecker, Jr. |
| 2008/0028231 | A1 | 1/2008 | Bender |
| 2008/0209229 | A1 | 8/2008 | Ramakrishnan et al. |
| 2008/0216172 | A1 | 9/2008 | Forman et al. |
| 2009/0134972 | A1 | 5/2009 | Wu, Jr. et al. |
| 2010/0274815 | A1 | 10/2010 | Vanasco |
| 2011/0047078 | A1 * | 2/2011 | Ginter .................. G06Q 20/123 705/53 |
| 2012/0098750 | A1 | 4/2012 | Allen et al. |
| 2013/0067547 | A1 * | 3/2013 | Thavasi ................. G06F 21/31 726/7 |
| 2013/0332723 | A1 | 12/2013 | Tan et al. |
| 2013/0347099 | A1 | 12/2013 | Smith |
| 2014/0096215 | A1 | 4/2014 | Hessler |
| 2014/0165170 | A1 | 6/2014 | Dmitriev et al. |
| 2014/0244456 | A1 | 8/2014 | Huang et al. |
| 2014/0282993 | A1 | 9/2014 | Van Till |
| 2015/0019424 | A1 | 1/2015 | Pourfallah et al. |
| 2015/0348024 | A1 | 12/2015 | Asokan et al. |
| 2016/0246396 | A1 | 8/2016 | Dickinson et al. |
| 2016/0359837 | A1 | 12/2016 | Krstic et al. |
| 2017/0004506 | A1 | 1/2017 | Steinman et al. |
| 2017/0124562 | A1 | 5/2017 | Hessler |
| 2017/0177855 | A1 * | 6/2017 | Costa Faidella ...... H04L 9/3236 |
| 2017/0193468 | A1 * | 7/2017 | Chougule ............ G06Q 20/102 |
| 2017/0257358 | A1 | 9/2017 | Ebrahimi et al. |
| 2017/0323302 | A1 | 11/2017 | Le Vallee |
| 2017/0329955 | A1 | 11/2017 | Hessler |
| 2017/0339151 | A1 | 11/2017 | Van Os et al. |
| 2017/0353309 | A1 * | 12/2017 | Gray .................. G06Q 20/3829 |
| 2018/0033002 | A1 | 2/2018 | Weiss et al. |
| 2018/0232739 | A1 | 8/2018 | Battle |
| 2019/0020480 | A1 * | 1/2019 | Camenisch ......... H04L 63/0823 |
| 2019/0108504 | A1 * | 4/2019 | Blinov ................. G06Q 20/223 |
| 2019/0114632 | A1 | 4/2019 | Rome et al. |
| 2019/0114636 | A1 * | 4/2019 | Rome .................. G06K 7/1417 |
| 2019/0114637 | A1 | 4/2019 | Rome et al. |
| 2019/0116050 | A1 | 4/2019 | Rome et al. |
| 2019/0116051 | A1 | 4/2019 | Rome et al. |
| 2019/0123907 | A1 | 4/2019 | Kim et al. |
| 2019/0311105 | A1 | 10/2019 | Beiter et al. |
| 2020/0057706 | A1 | 2/2020 | Rome et al. |
| 2021/0014060 | A1 | 1/2021 | Georgiadis et al. |

OTHER PUBLICATIONS

"U.S. Appl. No. 14/052,562, Amendment and Response filed Aug. 6, 2015 to Non-Final Office Action dated Apr. 6, 2015", 22 pgs.

"U.S. Appl. No. 14/052,562, Final Office Action dated Oct. 15, 2015", 23 pgs.

"U.S. Appl. No. 14/052,562, Non Final Office Action dated Apr. 6, 2015", 6 pgs.

"U.S. Appl. No. 14/052,562, Non Final Office Action dated Dec. 31, 2014", 22 pgs.

"U.S. Appl. No. 14/052,562, Notice of Allowance dated May 24, 2016", 10 pgs.

"U.S. Appl. No. 14/052,562, Response filed Jan. 13, 2015 to Non-Final Office Action dated Dec. 31, 2014", 11 pgs.

"U.S. Appl. No. 14/052,562, Response filed Mar. 15, 2016 to Final Office Action dated Oct. 15, 2015", 13 pgs.

Chok, Nian Shong, "Pearson's Versus Spearman's and Kendall's Correlation Coefficients for Continuous Data", Master's Thesis, University of Pittsburgh, (2010), 53 pgs.

Joyce, R., et al., "Identity Authentication Based on Keystroke Latencies", Communications of the Acme, vol. 33, No. 2, (Feb. 1990), 168-176.

Monrose, F., et al., "Keystroke dynamics as a biometric for authentication", Future Generation Computer Systems, 16, (2000), 351-359.

"U.S. Appl. No. 16/159,543, Preliminary Amendment filed Nov. 27, 2018", 7 pages.

"U.S. Appl. No. 16/159,560, Non Final Office Action dated May 13, 2020", 21 pages.

"U.S. Appl. No. 16/159,555, Notice of Allowance dated Sep. 4, 2020", 15 pgs.

"U.S. Appl. No. 16/159,560, Notice of Allowance dated Sep. 15, 2020", 16 pgs.

"U.S. Appl. No. 16/159,560, Notice of Allowance dated Sep. 23, 2020", 5 pgs.

"U.S. Appl. No. 16/159,560, Response filed Aug. 12, 2020 to Non-Final Office Action dated May 13, 2020", 21 pgs.

U.S. Appl. No. 16/544,397, filed Aug. 19, 2019, User Effort Detection.

"U.S. Appl. No. 16/159,543, Non Final Office Action dated Mar. 19, 2021", 18 pgs.

"U.S. Appl. No. 16/159,543, Response filed Jul. 19, 2021 to Non Final Office Action dated Mar. 19, 2021", 14 pgs.

(56) References Cited

OTHER PUBLICATIONS

"U.S. Appl. No. 16/159,547, Non Final Office Action dated Aug. 17, 2021", 14 pgs.

* cited by examiner

METHOD AND SYSTEM PROVIDING PEER EFFORT-BASED VALIDATION

CROSS-REFERENCE TO RELATED PATENT DOCUMENTS

This application claims the benefit of priority to U.S. Provisional Application Ser. No. 62/572,366, titled "AUTHENTICATION VIA USER EFFORT," filed on Oct. 13, 2017, which is incorporated herein by reference in its entirety. This application is also related to U.S. Pat. No. 9,430,626, titled, "User Authentication via Input of Known Text," awarded on Aug. 30, 2016; and to U.S. Provisional Patent Application Ser. No. 61/712,718, titled, "System and Method to Differentiate Input Device Users," filed on Oct. 11, 2012, both of which are reproduced below.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, Intensity Analytics. Inc. All Rights Reserved.

BACKGROUND

Major data breaches have exposed the Personally Identifiable Information (PII) of millions of individuals around the world, bringing attention to the security risk inherent in practice of using PII to index important, confidential information. The use of essentially any immutable data identifying/locating tags (e.g., name, address, Social Security Numbers (SSN), family information, as well as most forms of biometric data, such as fingerprints, iris pictures, and even DNA analysis, etc.) carries with it the inescapable cost of permanent, uncorrectable loss when the data, referred to as tags, becomes known. Tag exposure has proven to be endemic and can happen in many ways, either accidentally due to carelessness or process failure, or purposefully, as the result of some form of attack (e.g., insider threats, phishing, etc.). Whatever the reason, once such exposure has occurred, there is no path back, since these fact-based tags are difficult to change (e.g., SSN, etc.) or impossible to change (e.g., fingerprints, etc.).

DETAILED DESCRIPTION

Figure 1:
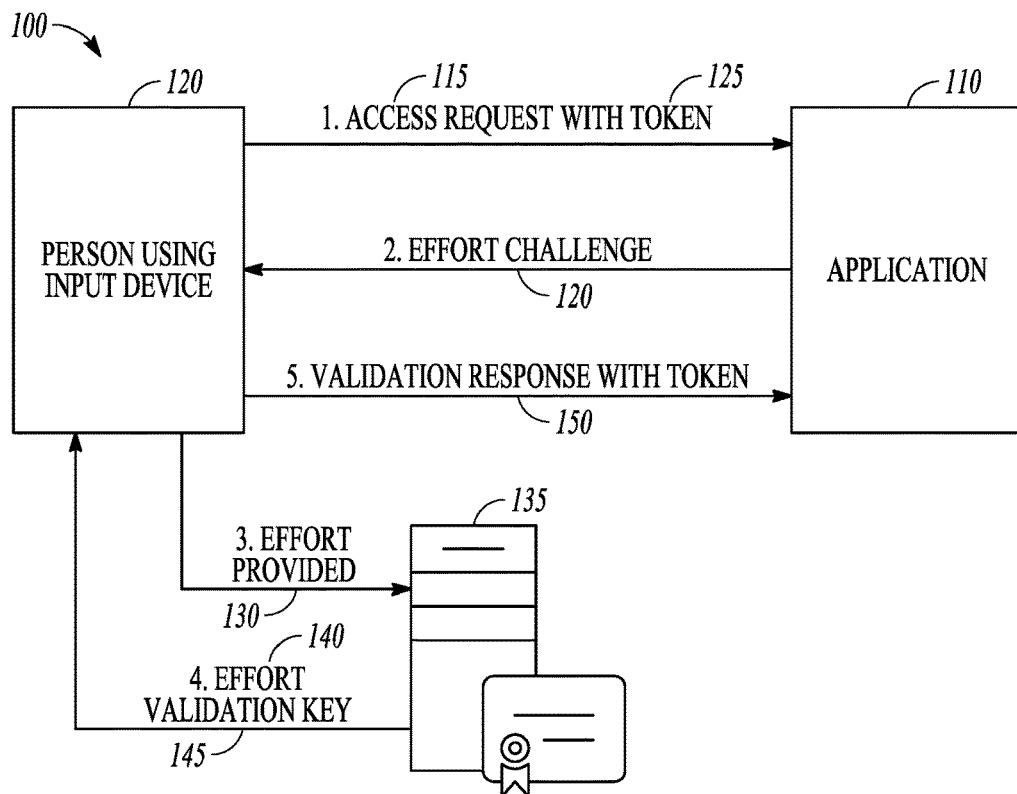
FIG. 1 is a block flow diagram representation of a system and method of validating a user according to an example embodiment.

Techniques for user authentication utilize a mathematical analysis of human effort measurements collected via a computer input device. The efforts under analysis may be such routine activities as typing cadence and gestures and rendered into a token. The token may be in the form of information encoded on a magnetic strip or an image, such as a QR code that may be used for transportation of a representation of a specific human's effort from one system to another in circumstances where such transportation is required. In the following detailed description, for purposes of explanation, numerous specific details are set forth in order to provide a thorough understanding of the various aspects of the presently disclosed subject matter. However, it will be evident to those skilled in the art that the presently disclosed subject matter may be practiced without these specific details. In other instances, well-known methods, procedures, and components have not been described in detail so as not to obscure the presently disclosed subject matter.

Various embodiments allow a user to authenticate themselves in a transaction with a third-party, such as a purchase of goods and/or services, or even accessing an account, including financial accounts. The third-party need not modify their system in order to assure that the user is who the user says they are. Additional embodiments allow a system to challenge a user for authentication, either directly or through a trusted, third-party validation system. Other embodiments include a process to attribute blockchain transactions to a person, and a capability for two peer systems to authenticate users without exchanging identifying data. Embodiments capture various user efforts and may also utilize a transportable effort key to accomplish the authentication.

Application Effort-Key

A system and method for a software as a service-type (SaaS-type) capability can authenticate a person's real-time identity claim by referencing, via webservices, a store of behavioral metrics (efforts) which were previously created by that same person in an environment where their legal identity was independently validated by an appropriately-credentialed authority, without exposing the behavioral metrics to the application that requires the authentication. This capability may be based on the techniques described in U.S. Pat. No. 9,430,626, which use Curse of Dimensionality resolution mathematics, as well as, without limitation, a combination of geospatial, multidimensional effort metrics technologies, including, barycentric, Random Sample Consensus, outlier analysis, Mahalanobis distance, and Bhattacharyya distance statistical techniques. Creating a statistically-useful, cohesive reference data store may be done using advanced Machine Learning and Artificial Intelligence engines which are given instructions on how to create rules about weighting different measurements and variances.

Various embodiments make reference to a token and a validation key. As used herein, a token is a package of data that is cryptographically signed, and may include information about a request, such as unique identifiers for the entities involved in the request transaction, along with behavior effort data, validation keys, and other metadata that is used for authentication. The token may also contain a hashchain signature that links a given token to a collection of other tokens.

A validation key is a unique, cryptographically signed value that is returned by the effort validation process that indicates the unique behavior provided in the original request was authenticated against a previously collected cadence and habit library ("PCCHL").

FIG. 1 is a block flow diagram representation of a system and method 100 of validating a user. An application 110, which utilizes PII-free (personally identifiable information-free) certainty can be set up to challenge a user to type a phrase or perform a gesture which has been previously successfully enrolled, and labelled with a known, public Token. Method 100 begins with a request 115 to a given application 100 from a person using an input device (Client) 120, which includes a Token value 125. That request is met with a Challenge 130 that includes an abstraction of the provided Token. The Challenge data is sent, along with the captured Effort 130, to a server 135 that has the previously-created store of validated Efforts associated with the given Token. The evaluation of the provided Efforts against the store of Efforts produces a set of results, called the Validation Key 140, that include both rendered Boolean match conclusion and statistics about the calculations, as well as information about the Challenge. That data is returned at 145 to the Client 120, which communicates at 150, the complete Validation Key to the Application 110. The Application 110 can take appropriate action based on the results, such as allowing access to application functions by the client 120. Note that in this embodiment, the Application 110 need only communicate directly with the input device, client 120, and not with a third-party, reducing the effort involved in modifying preexisting Applications to implement PII-free certainty.

For example, to access confidential payroll information, an employee may have to supply his/her e-mail address, and then enter a short string of characters from a keyboard. That kicks off a series of events, method 100, as described above, where the payroll information system responds with a challenge message, and the metrics captured from the typing effort is validated against an external system using validation mathematics, which may be of any desired form, including the mathematics referenced above and described in further detail in U.S. Pat. No. 9,460,626. The validation result is communicated through the client 120, back to the payroll system, where it confirms both the source of the challenge and interprets the validation result. The evaluation of the behavior metrics operates outside the scope of the target system, meaning that multiple systems can share the same repository of behavior metrics, and that data is completely insulated from the rest of the given system.

In one embodiment, application 110 is modified to implement a software library function provided by the third-party server to challenge the user for effort behavior with locally-generated token and accept a response token that can be decrypted to authenticate the contents which should include reference to the locally-generated token. In the simplified example below, the value of MyLocalValidationToken is passed, along with the name of a local server method that will accept the validation response, through the TickStream.tsEffortChallenge function to the third-party validation server. The result of that function, which authenticates the behavior effort, is returned to the server using the local method called login.aspx/validate, which decrypts the response to validate the token and authentication process.

```
<!DOCTYPE html>
    <head>
        <meta charset="utf-8" />
        <script type="text/javascript"
src="https://keyidservices.tickstream.com/library/keyid"></script>
    </head>
    <body>
        <script type="text/javascript">
            TickStream.tsEffortChallenge(MyLocalValidationToken,
        "login.aspx/validate");
        </script>
    </body>
</html>
```

In a further example embodiment, application 110 may be modified to i Implement a software library function provided by the third-party server to capture the behavior effort data to transmit the information directly to that third-party effort validation server, using common standards like web services. In the simplified example below, the value of MyLocalValidationToken is passed, along with the behavior effort data and other metadata assembled by the TickStream.tsBindControl function, through the TickStream.tsGetValidationToken function to the third-party validation server. The response token is stored in the validation field, which is returned to the server and decrypted to validate the token and authentication process.

```
<!DOCTYPE html>
    <head>
        <meta charset="utf-8" />
        <script type="text/javascript"
src="https://keyidservices.tickstream.com/library/keyid"></script>
    </head>
    <body>
        <input id="username" type="text">
        <br />
        <input id="password" type="password">
        <br />
        <input id="login" type="button" value="login"
onclick="TickStream.tsGetValidateToken(MyLocalValidationToken);">
        <input id="validation" type="hidden">
        <script type="text/javascript">
            TickStream.tsBindControl("password",
            TickStreamType.KeyID, true);
        </script>
    </body>
</html>
```

Independent Effort-Key

Figure 2:
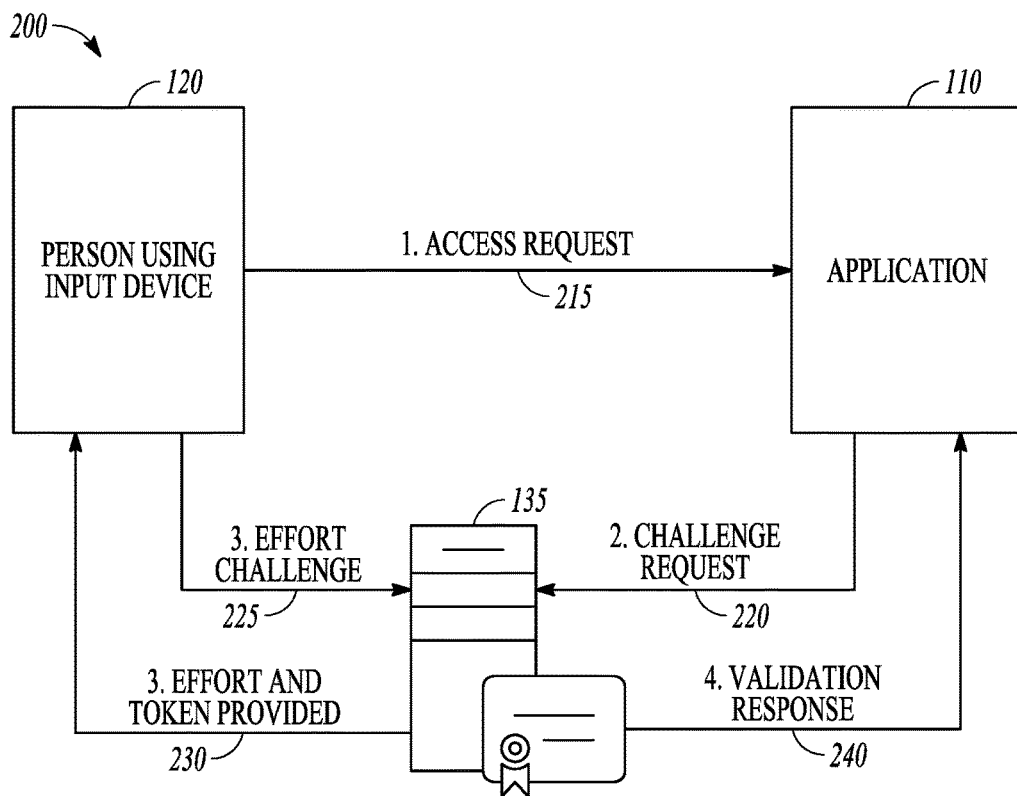
FIG. 2 is a block flow diagram illustration of a system and method for a software as a service-type (SAAS-type) capability according to an example embodiment.

FIG. 2 is a block flow diagram illustration of a system and method 200 for a software as a service-type (SaaS-type) capability. Reference numbers are consistent with previous figures. Method 200 can authenticate a person's real-time identity claim by referencing, via webservices 135, a store of behavioral metrics (Efforts) which were previously created by that same person in an environment where their legal identity was independently validated by an appropriately-credentialed authority. The application 110 that requires the authentication handles the validation process, method 200 directly. This capability may be based on muscle movement (aka "effort") metrics comparisons which use Curse of Dimensionality resolution mathematics, as well as, without limitation, a combination of geospatial, multidimensional effort metrics technologies, including, barycentric, Random Sample Consensus, outlier analysis, Mahalanobis distance, and Bhattacharyya distance statistical techniques. Creating a statistically-useful, cohesive reference data store may be done using advanced Machine Learning and Artificial Intelligence engines which are given instructions on how to create rules about weighting different measurements and variances. In addition to the requisite effort-based behavioral metrics, this method also additionally can support (collaboration, consideration and confirmation) the use of geo-fencing as well as device-specific hardware capabilities (e.g., fingerprints, proximity sensors, etc.) as well as other available device-resident biometric measurements (pictures, facial/voice recognition, etc.), as well as certain traditional Two-Factor Authentication ("2FA") techniques such as a Secret Phrase, Password, Pin Number, etc.

For example, as shown in FIG. 2, a person, client 120, that is eligible to participate in a clinical drug trial needs to be authenticated for the purposes of the given study and to meet FDA regulations, so the individual only needs to provide the Application 110 their identifier (such as an email address, patient number, photo, or similar "public" value) in an access request 215. The Application 110 sends a challenge request at 220 to an external system 135 that challenges the individual to perform a given effort at 225. Those behavioral effort metrics, along with any other corroborating metrics as described above are sent from the client 120 at 230 to system 135. System 135 validates the metrics against using the mathematics described in U.S. Pat. No. 9,460,626, reproduced below. A response message 240 is sent from the system 135 to the Application 110 confirming the results of the evaluation. By separating the capture and evaluation of the behavioral metrics from the authentication process, the identifying details are isolated from the Application system 110, and essentially any other token can be used as an identifier to anonymously confirm the individual presenting that token is the right physical person.

Transportable/Disconnected Effort-Key

Figure 3A:
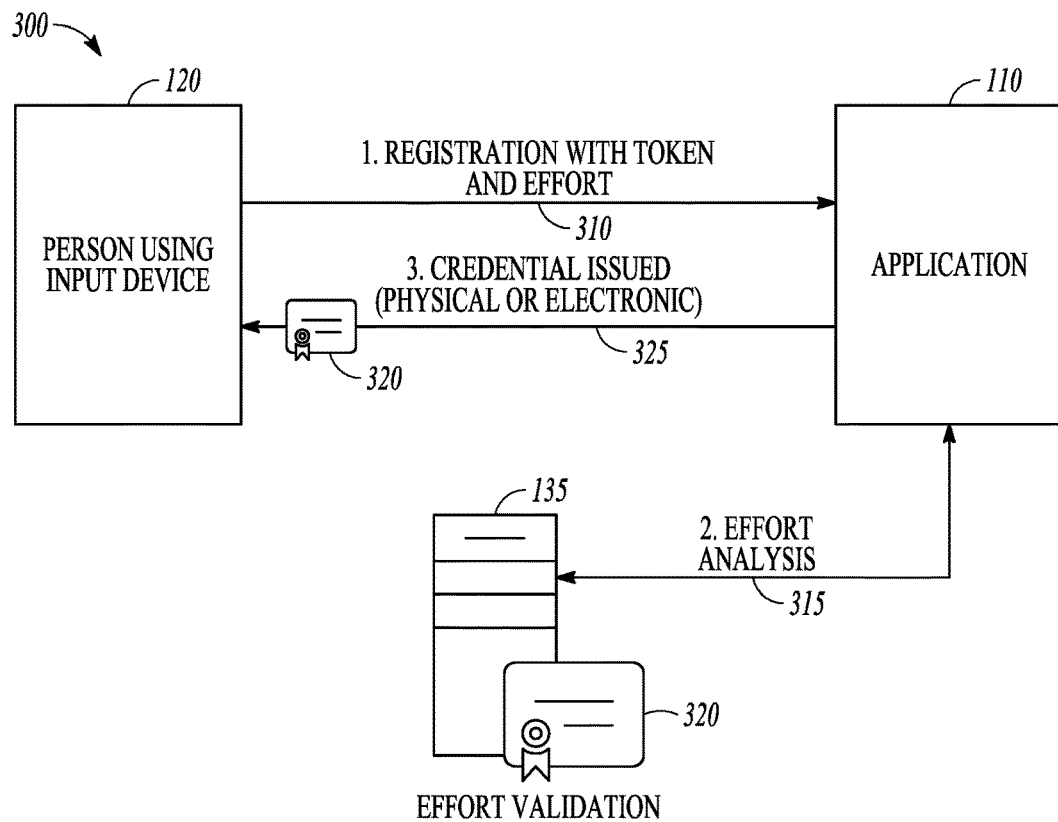
FIGS. 3A and 3B are block flow diagrams illustrating of a system and method for an identity-authenticating token generation, transportation and reading capability according to an example embodiment.
Figure 3B:
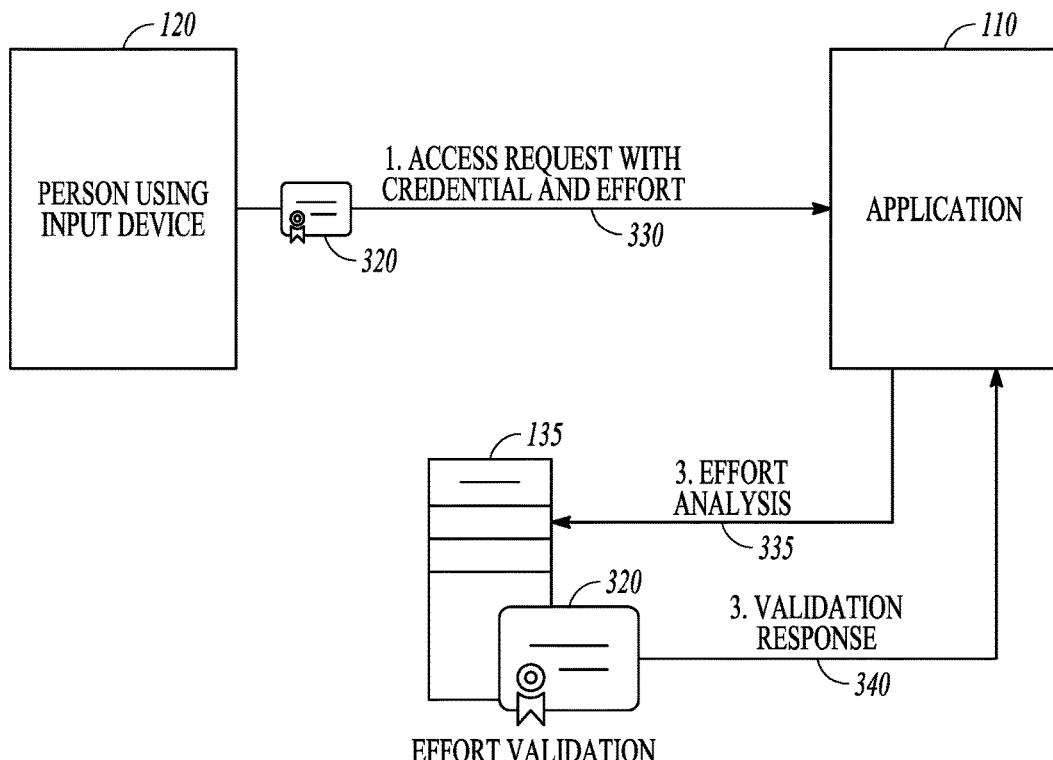

FIGS. 3A and 3B are block flow diagrams illustrating of a system and method 300 for an identity-authenticating token generation, transportation and reading capability. Reference numbers are consistent with previous figures. is a three-step process which can be used to authenticate a person's identity claim.

STEP ONE: The token is created from a store of behavioral metrics which were previously created by that same person in an environment where their legal identity was independently validated by an appropriately-credentialed authority. This effort metrics capture capability may be based on Curse of Dimensionality resolution mathematics, as well as, without limitation, a combination of geospatial, multidimensional effort metrics technologies, including, barycentric, Random Sample Consensus, outlier analysis, Mahalanobis distance, and Bhattacharyya distance statistical techniques. Creating a statistically-useful, cohesive reference data store is done using advanced Machine Learning and Artificial Intelligence engines which are given instructions on how to create rules about weighting different measurements and variances.

STEP TWO: The data composing the token is then typically rendered into a form that can be conveniently and routinely carried by a person, for example: (a) printed on paper to be carried "as is;" (b) inside a plasticized casing, (c) magnetically written onto a Personal Identity Verification (PIV) card, (d) loaded (and displayable) as an image that can be shown on a mobile device, (e) loaded (and displayable) in "QR code capability" format, (f) written to a file that can be carried on a USB stick or similar, or (g) written to a device that can be read using Near Field Communication (NFC) technology.

STEP THREE: Whenever there is a requirement to confirm a person's identity assertion, the person's token is produced to the challenger (in either desktop or office mode) (a) in one of the above or similar formats or via a compatible reading mechanism (such as an application) (b) for use in one of four alternative ways: (1) successfully follow specific directions on how and what to submit, then-and-there real-time, to compose a collection of matching muscle movement effort metrics using the capabilities and processes employing mathematics as described in U.S. Pat. No. 9,460,626; or (2) successfully match a request for a required conforming gesture on a mobile device; or (3) successfully produce a picture, or some other version of PII, so that challengers can perform their own security-assurance level of, and preference for, identity confirmation process; or (4) follow directions or answer questions called for in the token.

For example, as shown in FIG. 3A, a person, client 120 who is enrolled in a benefits program may be enrolled through a validation Application 110 that captures a variety of different data about a person, including behavioral metrics (Effort) via a registration communication 310. That Effort is provided from the application 110 to the system 135 via communications 315 and validated by the system 135 using the mathematics described in U.S. Pat. No. 9,460,626, and then rendered in a secure form as described in U.S. Provisional Patent Application Ser. No. 61/712,718. The abstraction is provided back to the application 110 via 315. This rendered abstraction of the Effort indicated at 320 is then stored in a modality conveniently and routinely carried by a person, as described above. In this illustration, it might be a physical card with an electronic storage device that contains the rendered Effort abstraction. The rendered abstraction of effort 320 is then provided back to the user as indicated at 325. Note that 320 may correspond to physical card or device storing data, or some electronic form or data as described above.

With reference to FIG. 3B, the person 120 may take that physical card 320 to a benefits provider as indicated at an access request 330 where they submit their credentials, and perform Effort, also indicated at 330, for validation. The Application submits the credentials, which contain the secure Effort abstraction, along with the current Effort, and those are validated by the system using the mathematics described in U.S. Pat. No. 9,460,626, reproduced below. This allows the person to take possession of a secure copy of their behavioral metrics, and reuse them on another, disconnected system that has no knowledge of the first system. Note that in FIG. 3, the person and input device do not need to directly communicate with the effort validation system.

Effort-Key Account Control

Figure 4:
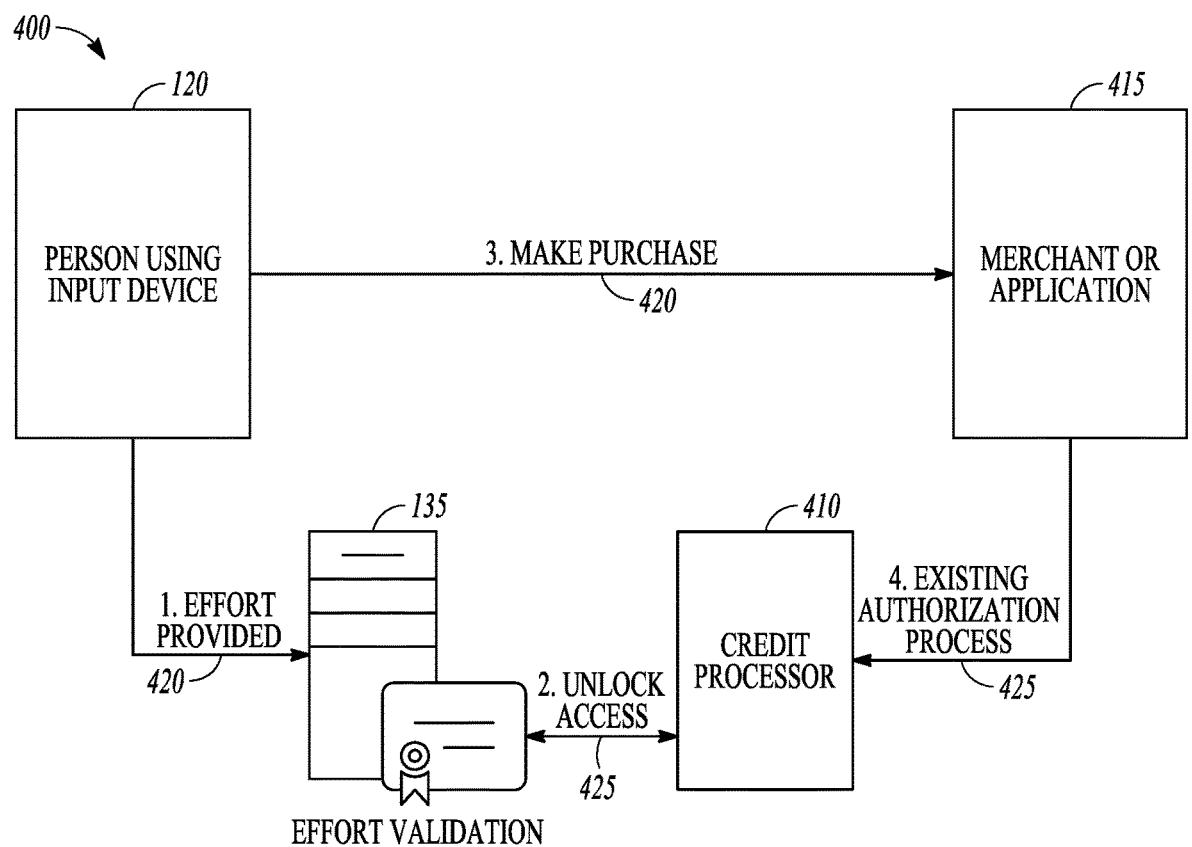
FIG. 4 is a block flow diagram illustration of a system and method for allowing a person to control account access at a credit processor for a transaction via merchant or application according to an example embodiment.

FIG. 4 is a block flow diagram illustration of a system and method 400 for allowing a person to control account access at a credit processor 410 for a transaction with a third-party entity, such as a merchant or application 415. Reference numbers are consistent with previous figures. Credit processor 410 may be a bank or credit card processor in various embodiments. Access is controlled by authenticating a person's real-time identity claim through referencing a store of behavioral metrics (Efforts) which were previously created by that same person in an environment where their legal identity was independently validated by an appropriately-credentialed authority for the purpose of denying all transactions unless specifically authorized through the use of performed effort behavior and/or other conditions as selected by the user, including location, transaction threshold, transaction history, etc. This allows the instant, widespread implementation of effort behavior for transaction authorization by merchants and vendors, since the authorization process remains unchanged at that level.

For example, as shown in FIG. 4, a person, client 120, that wishes to perform a financial transaction uses their device to perform an Effort that generates a set of behavioral metrics. That Effort is provided to system 135 at 420 and validated by the system 135 using the mathematics described in U.S. Pat. No. 9,460,626. If the results of that statistical evaluation pass given thresholds, a message 425 is sent to one or more credit processors 410, such as banks, credit card companies, credit reporting agencies, credit unions, and savings and loan institutions, that normally provide access to accounts for that person. The person conducts a normal business transaction with a merchant 415, and that merchant 415 processes the transaction as normal as indicated at 425 using existing authorization processes. This allows for easy, widespread adoption, since the only mechanism that involves the evaluation or processing of behavioral metrics is between the consumer (person) and the financial institutions, and no changes are required at the merchant.

The message 425 sent from the system 135 may include log-in information to facilitate access to the account at the credit processor 410, or a trusted relationship may already exist to obviate the need for log-in information. The message in various embodiments may indicate the account to unlock and may optionally include one or more of, a length of time to unlock the account and an identification of a merchant for one or more transactions may be processed. The merchant may then simply use an existing authorization process to execute the transaction with the client 120.

Effort-Key Blockchain Attribution

Figure 5:
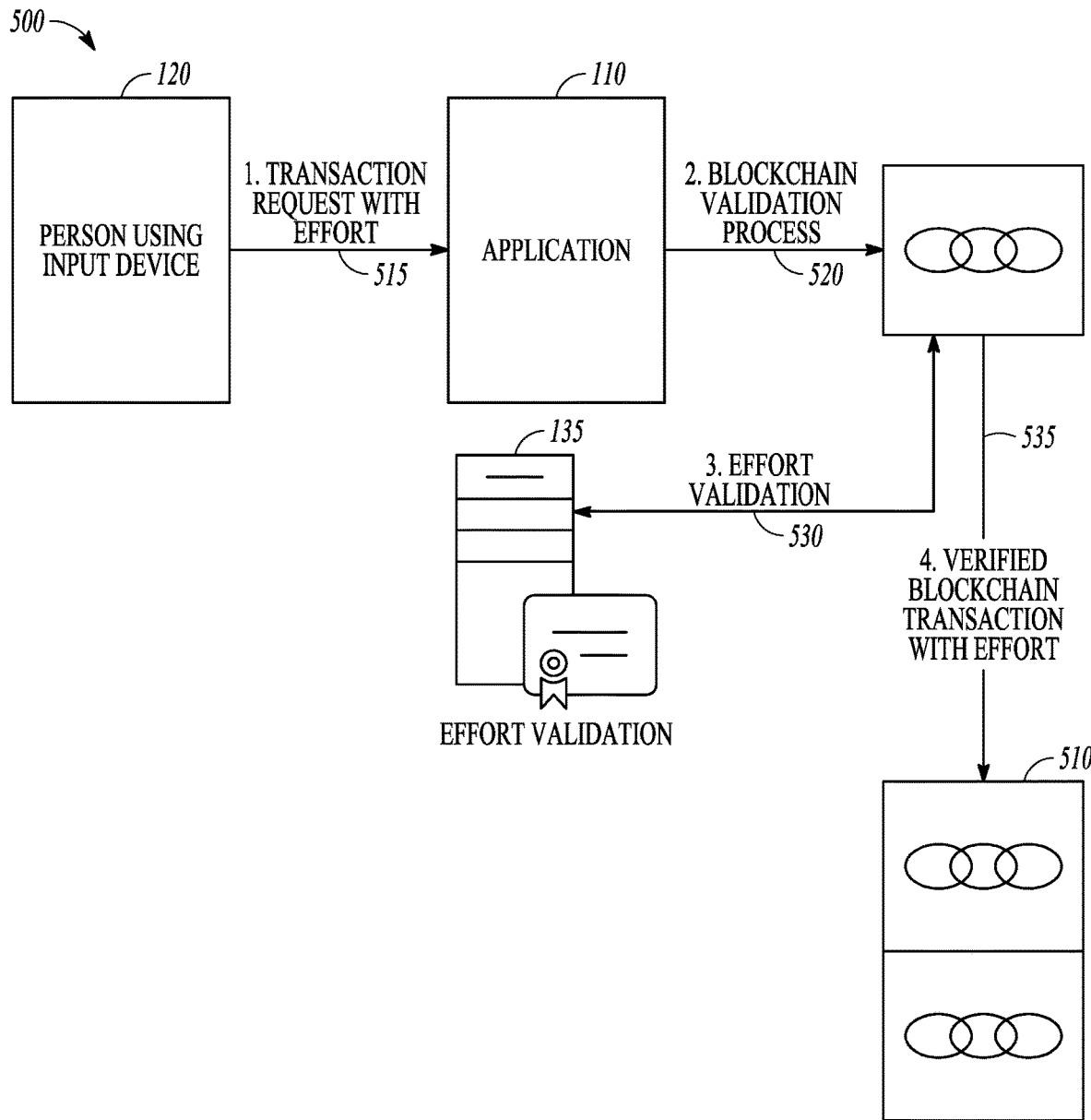
FIG. 5 is a block flow diagram illustration of a system and method for validating identify for adding a transaction to a blockchain according to an example embodiment.

FIG. 5 is a block flow diagram illustration of a system and method 500 for validating identify for adding a transaction to a blockchain. Reference numbers are consistent with previous figures. System and method 500 utilizes the aforementioned techniques in blockchain data 510 to associate data with a physical person, who may remain anonymous. Source/origination identity attribution is added to the immutability of blockchain transactions, using validated metrics. The metrics may be behavioral in nature, such as keystrokes, gestures on touch sensitive surfaces, or other efforts that are validated. Validation may be performed by mathematics described in U.S. Pat. No. 9,460,626 or other methods as desired. Other metrics may include biometric data, such as fingerprints, iris pictures, and even DNA analysis in further embodiments. The metrics may be encrypted in some embodiments to ensure anonymity. Basically, a blockchain is a continuously growing list of records called blocks, which are linked and cryptographically secured.

For example, as shown in FIG. 5 at 500, a person using an input device makes a request 515 to an application 110 to add a transaction to, or create, a blockchain. This request 515 includes a set of behavioral metrics that represent an Effort or other type of metrics. The application invokes at 520 a blockchain validation process 525. During the normal blockchain validation process 525, the metrics, such as Effort, are validated by the system 135 as indicated at 530 using the mathematics described in U.S. Pat. No. 9,460,626 or other suitable validation process consistent with the effort or metrics provided. An abstraction 535 of the evaluation results is added, along with the rest of the transaction data, to the blockchain 510. This significantly enhances the reliability of blockchain transactions, as it provides for the physical attribution of each transaction request. Note that the Effort stored with each blockchain transaction identifies the source of the transaction, without directly identifying the identity of the source. Note also that the effort may be different for each transaction associated with the same user, making it difficult for an attacker to associate transactions in the blockchain with a particular user. The different efforts may include different phrases to type, or different gestures to perform for each transaction.

Peer-to-Peer Effort-Key Authentication

Figure 6:
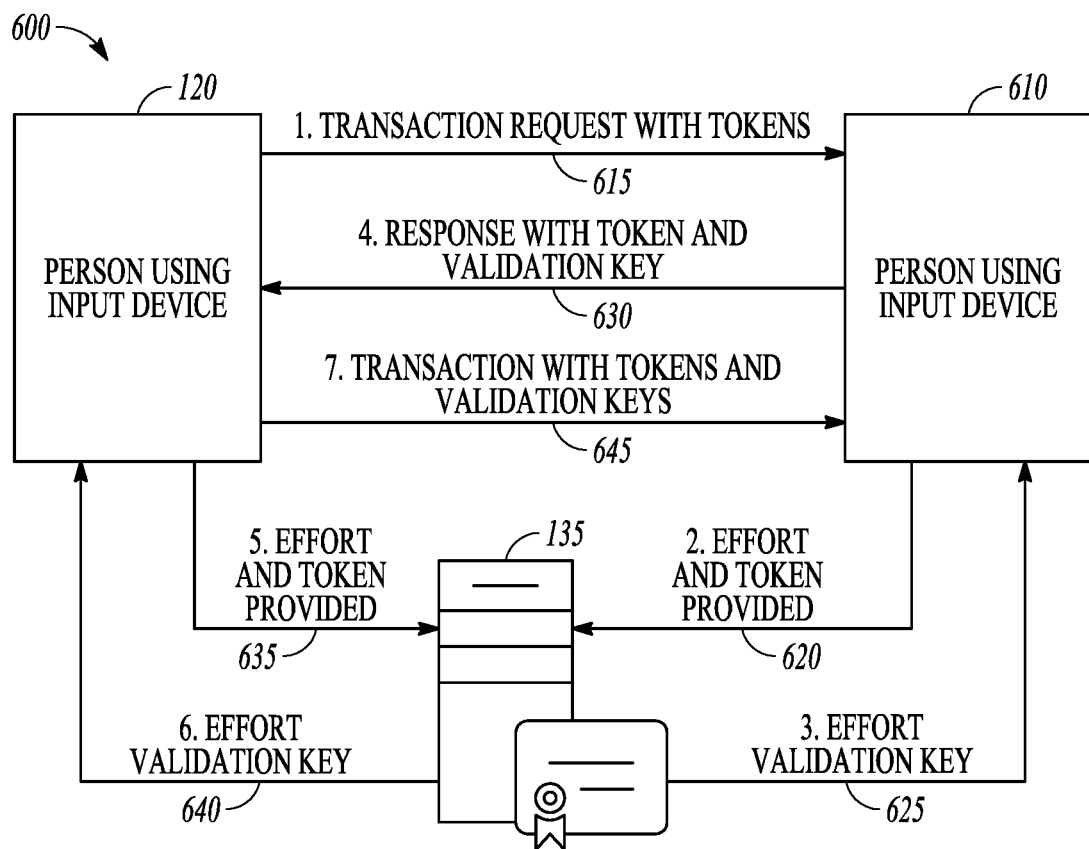
FIG. 6 is a block flow diagram illustration of a system and method for enabling two private entities/individuals to firmly establish the "useful identity" of each other according to an example embodiment.

FIG. 6 is a block flow diagram illustration of a system and method 600 for enabling two private entities/individuals to firmly establish the "useful identity" of each other. Reference numbers are consistent with previous figures. The system and method 600 enables two private entities/individuals 120 and 610 to firmly establish the "useful identity" of each other, using various metrics described above, such as behavioral metrics (Effort) validated by the mathematics described in U.S. Pat. No. 9,460,626. "Useful Identity" in this case permits and provides one-time, peer-to-peer, capabilities for two transacting parties to know for sure that the person "on the other end" is always the same person—without having to exchange any identifying information.

For example, as shown in FIG. 6, two individual people 120, 610 may need to conduct a transaction. Metrics, such as behavior metrics (Effort) may be used to ensure both parties are consistent through the transaction, as well as to ensure future transactions are conducted by the same people. This begins with a transaction request 615, including a token, from the first person 120, which the second person responds to at 630 with a token value derived from the results of submitting their metric or Effort and token at 620 to a trusted third-party system 135, and validated by the mathematics described in U.S. Pat. No. 9,460,626, reproduced below or other metric dependent validation method. The second person 620 receives the effort and a validation key at 625 from the system 135 and provides them to the first person 120 at 630.

The first person submits the effort along with a token value derived from the results of submitting at 635 their Effort to a trusted third-party system 135. System 135 validates the effort for example, by the mathematics described in U.S. Pat. No. 9,460,626 and provides the validation to the first person 120 at 640. The first person 120 then provides a transaction with tokens and validation keys to the second user 610 as indicated at 645 to perform the transaction. In this way, both parties can authenticate that each person remains the same through the given transaction, and use those same tokens to authenticate future transactions, without disclosing any other information to one another. Virtual currency transactions may greatly benefit from the use of this method.

In summary, the above described example embodiments enable implementation of various methods, including one or more of the following methods. A method and system where an application challenges the user for effort, and that effort is confirmed by a trusted third-party.

A method and system where an application requests an effort challenge from a third-party, and that third-party challenges the user. A method and system where a credential is issued with effort metrics, which can be submitted to an application. That application submits the credentials and the real-time effort to a third-party for validation.

A method and system to provide a temporary unlocked access to accounts through effort metrics, so that normal purchasing activities are allowed.

A method and system to use effort metrics and validation to provide attribution to blockchain transactions.

A method and system to allow two peers to provide physical user validation through a third-party without disclosing PII.

Figure 7:
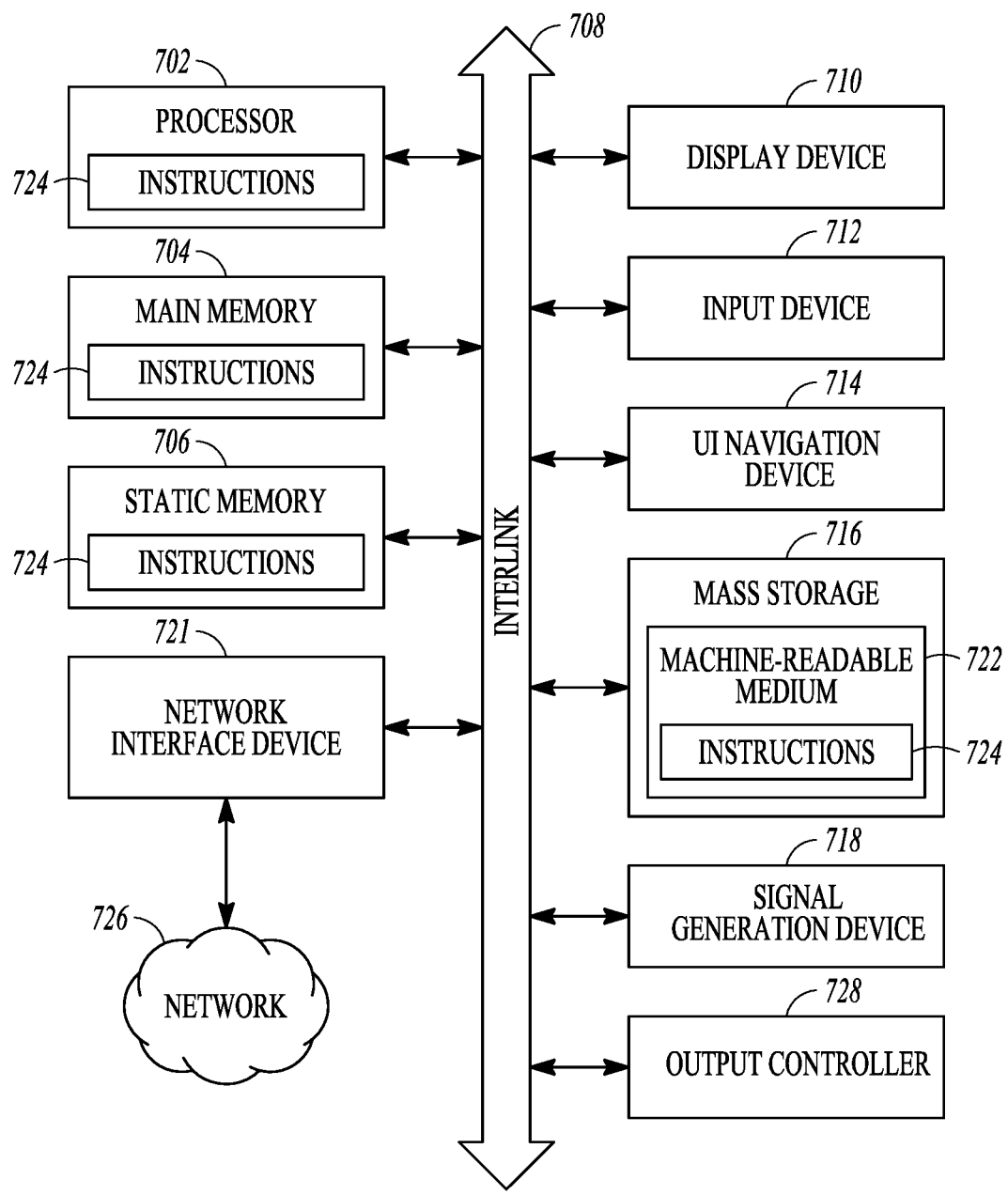
FIG. 7 is a block diagram illustrating an example of a machine upon which any example embodiments may be implemented.

FIG. 7 is a block diagram illustrating an example of a machine 100, upon which any example embodiments may be implemented. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may perform, alone or in combination, specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the machine-readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 100 may include a hardware processor 102 (e.g., a central processing unit (CPU), a graphics processing unit (GPU), a hardware processor core, or any combination thereof), a main memory 104 and a static memory 106, some or all of which may communicate with each other via an interlink (e.g., bus) 108. The machine 100 may further include a display device 110, an input device 112 (e.g., buttons, switches, a keyboard, etc.), and a user interface (UI) navigation device 114 (e.g., a pointing stick, an isometric joystick or other isometric device, etc.). In an embodiment, the display device 110, input device 112, and UI navigation device 114 may be a touch screen display. The machine 100 may additionally include a storage device (e.g., drive unit) 116, a signal generation device 118 (e.g., a speaker), a network interface device 120, and a sensor 121, such as a global positioning system (GPS) sensor, compass, accelerometer, or other sensor. The machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 116 may include a machine-readable medium 122, on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the machine 100. In an example, one or any combination of the hardware processor 102, the main memory 104, the static memory 106, or the storage device 116 may constitute machine-readable media.

Although the machine-readable medium 122 is illustrated as a single medium, the term "machine-readable medium" may include a single medium or multiple media (e.g., a centralized or distributed database, and/or associated caches and servers) arranged to store the one or more instructions 124.

The term "machine-readable medium" may include any medium that is capable of storing, encoding, or carrying instructions for execution by the machine 100 and that cause the machine 100 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, IEEE 802.15.1 family of standards (known as Bluetooth®), peer-to-peer (P2P) networks, among others. In an embodiment, the network interface device 120 may include one or more physical jacks (e.g., Ethernet, coaxial, or phone jacks) and/or one or more antennas to connect to the communications network 126. In an example, the network interface device 120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 100, and includes digital or analog communications signals or other intangible medium to facilitate communication of such software.

The various operations of the example methods described herein may be performed, at least partially, by one or more processors that are temporarily arranged (e.g., by software instructions) or permanently arranged to perform the relevant operations. Whether temporarily or permanently arranged, such processors may constitute processor-implemented modules or objects that operate to perform one or more operations or functions. The modules and objects referred to herein, in some example embodiments, may comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but also deployed across a number of machines or computers. In some example embodiments, the processor or processors may be located in a single location (e.g., within a home environment, an office environment, at a server farm, etc.), while in other embodiments, the processors may be distributed across a number of locations.

The one or more processors may also operate to support performance of the relevant operations in a "cloud computing" environment or within the context of software as a service (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Examples are now provided. Various elements from the example may be combined to form different embodiments.

System and Method for Effort-Based User Authentication

1. A method of authenticating a user of a user device, the method comprising:
receiving a user effort-based identity authentication token from a user device;
generating a challenge request;
receiving an effort validation response, generated by an effort validation server in response to a user performed requested effort;
receiving the effort-based identity authentication token; and
authenticating the user as a function of the received validation response and the user effort-based identity authentication token.

2. The method of example 1 wherein the user efforts comprise user device keyboard user efforts.

3. The method of any of examples 1-2 wherein the user efforts comprise gestures associated with user device touch screen user interaction.

4. The method of any of examples 1-3 wherein the user effort-based identity authentication token comprises user effort data encoded into a QR code.

5. The method of any of examples 1-4 wherein the user effort-based identity authentication token comprises user effort data encoded into a portable digital storage device.

6. The method of any of examples 1-5 wherein the authentication server is a server running an application that the user device attempts to access.

7. The method of any of examples 1-6 wherein the authentication server is a separate server from a server running an application that the user device attempts to access.

8. The method of any of examples 1-7 wherein the validation response includes a validation key that includes both rendered Boolean match conclusion and statistics about the calculations, as well as information about the challenge.

9. The method of any of examples 1-8 wherein the challenge is an effort challenge provided to the user device.

10. The method of any of examples 1-9 wherein the challenge is provided to the validation server.

11. The method of any of examples 1-10 wherein the validation response and token are received from the user device.

12. A system for performing a method of authenticating a user of a user device, the system comprising:
a processor;
a communication device coupled to the processor for communicating with other devices; and
a memory storing computer readable instructions coupled to the processor, the instructions for execution by the processor to perform operations comprising:
receiving a user effort-based identity authentication token from a user device;
generating a challenge request;
receiving an effort validation response, generated by an effort validation server in response to a user performed requested effort;
receiving the effort-based identity authentication token; and
authenticating the user as a function of the received validation response and the user effort-based identity authentication token.

13. A method of authenticating a user, the method comprising:
receiving an access request with a user effort-based identity authentication token from a user device;
generating an effort challenge as a function of the token;
sending the effort challenge to the user device;
receiving a validation response and the token from the user device, wherein the validation response is based on user effort responsive to the effort challenge being validated by a validation server which provides a validation key; and
granting access to the user device responsive to the access request with token and the validation response with token.

14. The method of example 13 wherein the validation response includes the validation key.

15. The method of any of examples 13-14 wherein the validation response includes a validation key that includes both rendered Boolean match conclusion and statistics about the calculations, as well as information about the challenge.

16. The method of any of examples 13-15 wherein the challenge is provided to the validation server.

17. The method of any of examples 13-16 wherein the validation response and token are received from the user device.

18. A method of authenticating a user via an authentication server in communication with a user device and an application, the method comprising:
receiving an access request;
generating and sending a challenge request to the authentication server;
receiving a validation response from the validation server, wherein the validation response is representative of an effort challenge to the user device and a corresponding effort and user effort-based identity authorization token received from the user device; and allowing access responsive to the validation response.

19. The method of example 18 wherein the authentication server is a separate server from a server running an application that the user device attempts to access.

20. The method of any of examples 18-19 wherein the access request includes a public value identifying the user.

System and Method for Independent User Effort-Based Validation Examples:

1. A method of authenticating a user based on user effort, the method comprising:

receiving a registration from a user device with a user effort-based identity authorization token and a first user effort;

submitting the first effort to the effort validation server;

receiving an effort analysis from the effort validation server;

issuing a credential to the user device based on the effort analysis;

receiving an access request from the user device, the access request including the credential and a second effort;

providing the second effort to the validation server;

receiving a validation response from the validation server; and granting access to the user device as a function of the validation response.

2. The method of example 1 wherein the user efforts comprise user device keyboard user efforts.

3. The method of any of examples 1-2 wherein the user efforts comprise gestures associated with user device touch screen user interaction.

4. The method of any of examples 1-3 wherein the credential comprises user effort data encoded into a QR code.

5. The method of any of examples 1-4 wherein the credential comprises user effort data encoded into a portable digital storage device.

6. The method of any of examples 1-5 wherein the authentication server is a server running an application that the user device attempts to access.

7. The method of any of examples 1-6 wherein the authentication server is a separate server from a server running an application that the user device attempts to access.

8. The method of any of examples 1-7 wherein the validation response includes a validation key that includes both rendered Boolean match conclusion and statistics about the calculations, as well as information about the challenge.

9. A method of authenticating a user based on user efforts, the method comprising:

receiving an access request from the user device, the access request including a credential and a current access request effort and wherein the credential is based on a validation server validation of a previous user effort;

providing the current effort to the validation server;

receiving a validation response from the validation server; and granting access to the user device as a function of the validation response.

10. The method of example 9 wherein the user efforts comprise user device keyboard user efforts.

11. The method of any of examples 9-10 wherein the user efforts comprise gestures associated with user device touch screen user interaction.

12. The method of any of examples 9-11 wherein the credential comprises user effort data encoded into a QR code.

13. The method of any of examples 9-12 wherein the credential comprises user effort data encoded into a portable digital storage device.

14. The method of any of examples 9-13 wherein the authentication server is a server running an application that the user device attempts to access.

15. The method of any of examples 9-14 wherein the authentication server is a separate server from a server running an application that the user device attempts to access.

16. The method of any of examples 9-15 wherein the validation response includes a validation key that includes both rendered Boolean match conclusion and statistics about the calculations, as well as information about the challenge.

17. A system for performing a method of authenticating a user based on user efforts, the system comprising:

a processor;

a communication device coupled to the processor for communicating with other devices; and a memory storing computer readable instructions coupled to the processor, the instructions for execution by the processor to perform operations comprising:

receiving an access request from the user device, the access request including a credential and a current access request effort and wherein the credential is based on a validation server validation of a previous user effort;

providing the current effort to the validation server;

receiving a validation response from the validation server; and granting access to the user device as a function of the validation response.

18. The system of example 17 wherein the user efforts comprise user device keyboard user efforts.

19. The system of any of examples 17-18 wherein the user efforts comprise gestures associated with user device touch screen user interaction.

20. The system of any of examples 17-19 wherein the validation response includes a validation key that includes both rendered Boolean match conclusion and statistics about the calculations, as well as information about the challenge.

Method and System to Unlock Account Access Via Effort Metrics Examples:

1. A method of allowing access to an account at a credit processing system, the method comprising:

receiving an unlock access communication from an effort validation server based on user effort provided from a user device to the effort validation server being validated by the validation server; and authorizing access to the account in response to the unlock access communication to authorize a transaction by a third-party entity based on a user device transaction with the third-party entity.

2. The method of example 1 wherein the user efforts comprise user device keyboard user efforts.

3. The method of any of examples 1-2 wherein the user efforts comprise gestures associated with user device touch screen user interaction.

4. The method of any of examples 1-3 wherein the effort validation server is a separate server from the credit processing system.

5. The method of any of examples 1-4 wherein the transaction comprises an existing normal transaction with the by the third-party entity.

6. The method of example 5 wherein the third-party entity comprises an on-line merchant.

7. The method of example 5 wherein the third-party entity comprises a physical location of a merchant.

8. The method of example 5 wherein the third-party entity comprises a computer executed application.

9. The method of example 5 wherein the transaction comprises a credit card processing transaction.

10. A system for performing a method of allowing access to an account at a credit processing system, the system comprising:
a processor;
a communication device coupled to the processor for communicating with other devices; and
a memory storing computer readable instructions coupled to the processor, the instructions for execution by the processor to perform operations comprising:
receiving an unlock access communication from an effort validation server based on user effort provided from a user device to the effort validation server being validated by the validation server; and
authorizing access to the account in response to the unlock access communication to authorize a transaction by a third-party entity based on a user device transaction with the third-party entity.

11. The system of example 10 wherein the user efforts comprise user device keyboard user efforts.

12. The system of any of examples 10-11 wherein the user efforts comprise gestures associated with user device touch screen user interaction.

13. The system of any of examples 10-12 wherein the transaction comprises an existing normal transaction with the by the third-party entity.

14. The system of example 13 wherein the third-party entity comprises an on-line merchant, a physical location of a merchant, or a computer executed application.

15. The system of example 13 wherein the transaction comprises a credit card processing transaction.

16. A machine-readable storage device having instructions for execution by a processor of a machine to cause the processor to perform operations to perform a method of allowing access to an account at a credit processing system, the operations comprising:
receiving an unlock access communication from an effort validation server based on user effort provided from a user device to the effort validation server being validated by the validation server; and
authorizing access to the account in response to the unlock access communication to authorize a transaction by a third-party entity based on a user device transaction with the third-party entity.

17. The device of example 16 wherein the user efforts comprise user device keyboard user efforts.

18. The device of any of examples 16-17 wherein the user efforts comprise gestures associated with user device touch screen user interaction.

19. The device of any of examples 16-18 wherein the transaction comprises an existing normal transaction with the by the third-party entity.

20. The device of any of examples 16-19 wherein the third-party entity comprises an on-line merchant, a physical location of a merchant, or a computer executed application and wherein the transaction comprises a credit card processing transaction.

Method and System to Provide Attribution to Blockchain Transactions Examples:

1. A method of validating and providing attribution to blockchain transactions, the method comprising:
receiving a transaction request with a representation of user metrics from a user input device;
requesting validation from an effort validation server by providing the representation of the metrics to the effort validation server;
receiving a metric validation from the metric validation server; and
adding the transaction to a blockchain of transactions, the transaction having been validated and including the metric with the transaction in the blockchain such that the transaction is validated and attributed.

2. The method of example 1 wherein the attribution comprises a representation of user efforts that preserve anonymity of the user.

3. The method of any of examples 1-2 wherein the user metrics comprise user device keyboard user efforts.

4. The method of any of examples 1-3 wherein the user metrics comprise gestures associated with user device touch screen user interaction.

5. The method of any of examples 1-4 wherein the authentication server is a server running an application performing the method.

6. The method of any of examples 1-5 wherein the authentication server is a separate server from a server running an application performing the method.

7. The method of any of examples 1-6 wherein the user metrics comprise biometric data of the user.

8. The method of any of examples 1-7 wherein the user metrics comprise encrypted biometric data.

9. A system for performing a method of validating and providing attribution to blockchain transactions, the system comprising:
a processor;
a communication device coupled to the processor for communicating with other devices; and
a memory storing computer readable instructions coupled to the processor, the instructions for execution by the processor to perform operations comprising:
receiving a transaction request with a representation of user metrics from a user input device;
requesting validation from an effort validation server by providing the representation of the metrics to the effort validation server;
receiving a metric validation from the metric validation server; and
adding the transaction to a blockchain of transactions, the transaction having been validated and including the metric with the transaction in the blockchain such that the transaction is validated and attributed.

10. The system of example 9 wherein the attribution comprises a representation of user efforts that preserve anonymity of the user.

11. The system of any of examples 9-10 wherein the user metrics comprise user device keyboard user efforts.

12. The system of any of examples 9-11 wherein the user metrics comprise gestures associated with user device touch screen user interaction.

13. The system of any of examples 9-12 wherein the authentication server is a server running an application performing the method.

14. The system of any of examples 9-13 wherein the authentication server is a separate server from a server running an application performing the method.

15. The system of any of examples 9-14 wherein the user metrics comprise biometric data of the user.

16. The system of any of examples 9-15 wherein the user metrics comprise encrypted biometric data.

17. A machine-readable storage device having instructions for execution by a processor of a machine to cause the processor to perform operations to perform a method of validating and providing attribution to blockchain transactions, the operations comprising:
receiving a transaction request with a representation of user metrics from a user input device;
requesting validation from an effort validation server by providing the representation of the metrics to the effort validation server;
receiving a metric validation from the metric validation server; and
adding the transaction to a blockchain of transactions, the transaction having been validated and including the metric with the transaction in the blockchain such that the transaction is validated and attributed.

17. The device of example 16 wherein the attribution comprises a representation of user efforts that preserve anonymity of the user.

18. The device of any of examples 16-17 wherein the user metrics comprise user device keyboard user efforts.

19. The device of any of examples 16-18 wherein the user metrics comprise gestures associated with user device touch screen user interaction.

20. The device of any of examples 16-19 wherein the user metrics comprise encrypted biometric data.

Method and System Providing Peer Effort-Based Validation Examples:

1. A method of performing a transaction between a first user of a first input device, and a second user of a second input device, the method comprising:
generating, via the first input device, a transaction request with a with a first effort-based identity token associated with first user;
receiving a response with the token and a validation key obtained from a validation server via the second input device based on a second effort-based identity token associated with the second user and a second user effort;
providing the second user effort and second effort-based identity token to the validation server;
receiving a second effort validation key from the validation server; and
sending the transaction with the first user and second user identity-based tokens and first and second effort validation keys to the second person to complete the transaction while ensuring both the first and second users are consistent throughout the transaction.

2. The method of example 1 wherein the user efforts comprise user device keyboard user efforts.

3. The method of any of examples 1-2 wherein the user efforts comprise gestures associated with user device touch screen user interaction.

4. The method of any of examples 1-3 wherein the user effort-based identity authentication token comprises user effort data encoded into a QR code.

5. The method of any of examples 1-4 wherein the user effort-based identity authentication token comprises user effort data encoded into a portable digital storage device.

6. The method of any of examples 1-5 wherein the response includes a validation key that includes both rendered Boolean match conclusion and statistics about the calculations, as well as information about the challenge.

7. The method of any of examples 1-6 wherein the transaction is sent without revealing personal identifying information.

8. The method of example 7 and further comprising using the first and second user identity tokens for additional transactions, ensuring both users remain the same for transactions.

9. A system for performing a method of performing a transaction between a first user of a first input device, and a second user of a second input device, the system comprising:
a processor;
a communication device coupled to the processor for communicating with other devices; and
a memory storing computer readable instructions coupled to the processor, the instructions for execution by the processor to perform operations comprising:
generating, via the first input device, a transaction request with a with a first effort-based identity token associated with first user;
receiving a response with the token and a validation key obtained from a validation server via the second input device based on a second effort-based identity token associated with the second user and a second user effort;
providing the second user effort and second effort-based identity token to the validation server;
receiving a second effort validation key from the validation server; and
sending the transaction with the first user and second user identity-based tokens and first and second effort validation keys to the second person to complete the transaction while ensuring both the first and second users are consistent throughout the transaction.

10. The system of example 9 wherein the user efforts comprise at least one of user device keyboard user efforts and gestures associated with user device touch screen user interaction.

11. The system of any of examples 9-10 wherein the user effort-based identity authentication tokens comprises user effort data encoded into a QR code.

12. The system of any of examples 9-11 wherein the user effort-based identity authentication tokens comprises user effort data encoded into a portable digital storage device.

13. The system of any of examples 9-12 wherein the response includes a validation key that includes both rendered Boolean match conclusion and statistics about the calculations, as well as information about the challenge.

14. The system of any of examples 9-13 wherein the transaction is sent without revealing personal identifying information.

15. The system of example 14 wherein the operations further comprise using the first and second user identity tokes for additional transactions, ensuring both users remain the same for transactions.

16. A machine-readable storage device having instructions for execution by a processor of a machine to cause the processor to perform operations to perform a method of performing a transaction between a first user of a first input device, and a second user of a second input device, the operations comprising:
generating, via the first input device, a transaction request with a with a first effort-based identity token associated with first user;
receiving a response with the token and a validation key obtained from a validation server via the second input device based on a second effort-based identity token associated with the second user and a second user effort;

providing the second user effort and second effort-based identity token to the validation server;

receiving a second effort validation key from the validation server; and sending the transaction with the first user and second user identity-based tokens and first and second effort validation keys to the second person to complete the transaction while ensuring both the first and second users are consistent throughout the transaction.

17. The device of example 16 wherein the user efforts comprise at least one of user device keyboard user efforts and gestures associated with user device touch screen user interaction.

18. The device of any of examples 16-17 wherein the response includes a validation key that includes both rendered Boolean match conclusion and statistics about the calculations, as well as information about the challenge.

19. The device of any of examples 16-18 wherein the transaction is sent without revealing personal identifying information.

20. The device of any of examples 16-19 wherein the operations further comprise using the first and second user identity tokens for additional transactions, ensuring both users remain the same for transactions.

Additional Notes

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

Method examples described herein may be machine or computer-implemented at least in part. Some examples may include a machine-readable medium or machine-readable medium encoded with instructions operable to configure an electronic device to perform methods as described in the above examples. An implementation of such methods may include code, such as microcode, assembly language code, a higher-level language code, or the like. Such code may include machine-readable instructions for performing various methods. The code may form portions of computer program products. Further, in an example, the code may be tangibly stored on one or more volatile, non-transitory, or non-volatile tangible machine-readable media, such as during execution or at other times. Examples of these tangible machine-readable media may include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The invention claimed is:

1. A method of performing a transaction between a first user of a first input device and a second user of a second input device, the method comprising:

generating, via the first input device, a transaction request with a first effort-based identity token associated with the first user and a first user effort;

receiving a response with the first effort-based identity token and a first effort validation key obtained from a validation server via the second input device based on a second effort-based identity token associated with the second user and a second user effort;

providing the second user effort and second effort-based identity token to the validation server;

receiving a second effort validation key from the validation server; and sending the transaction with the first and second effort-based identity tokens and the first and second effort validation keys to the second user to complete the transaction while ensuring both the first and second users are consistent throughout the transaction.

2. The method of claim 1, wherein the first and second user efforts comprise user device keyboard user efforts.

3. The method of claim 1, wherein the first and second user efforts comprise gestures associated with user device touch screen user interaction.

4. The method of claim 1, wherein the first or second effort-based identity token comprises user effort data encoded into a QR code.

5. The method of claim 1, wherein the first or second effort-based identity token comprises user effort data encoded into a portable digital storage device.

6. The method of claim 1, wherein the response includes the first effort validation key having both rendered Boolean match conclusion and statistics about calculations of the first effort validation key, as well as information about a challenge.

7. The method of claim 1, wherein the transaction is sent without revealing personal identifying information.

8. The method of claim 7, further comprising using the first and second effort-based identity tokens for additional transactions, ensuring both users remain the same for transactions.

9. A system for performing a method of performing a transaction between a first user of a first input device and a second user of a second input device, the system comprising:

a processor;

a communication device coupled to the processor for communicating with other devices; and a memory storing computer readable instructions coupled to the processor, the instructions for execution by the processor to perform operations comprising:

generating, via the first input device, a transaction request with a first effort-based identity token associated with the first user and a first user effort;

receiving a response with the first effort-based identity token and a first effort validation key obtained from a validation server via the second input device based on a second effort-based identity token associated with the second user and a second user effort;

providing the second user effort and second effort-based identity token to the validation server;

receiving a second effort validation key from the validation server; and sending the transaction with the first and second effort-based identity tokens and the first and second effort validation keys to the second user to complete the transaction while ensuring both the first and second users are consistent throughout the transaction.

10. The system of claim 9, wherein the first and second user efforts comprise at least one of user device keyboard user efforts and gestures associated with user device touch screen user interaction.

11. The system of claim 9, wherein the first and second user effort-based identity authentication tokens comprises user effort data encoded into a QR code.

12. The system of claim 9, wherein the first or second effort-based identity tokens comprises user effort data encoded into a portable digital storage device.

13. The system of claim 9, wherein the response includes the first effort validation key having both rendered Boolean match conclusion and statistics about calculations of the first effort validation key, as well as information about a challenge.

14. The system of claim 9, wherein the transaction is sent without revealing personal identifying information.

15. The system of claim 14, wherein the operations further comprise using the first and second effort-based identity tokens for additional transactions, ensuring both users remain the same for transactions.

16. A machine-readable storage device having instructions for execution by a processor of a machine to cause the processor to perform operations to perform a method of performing a transaction between a first user of a first input device and a second user of a second input device, the operations comprising:

generating, via the first input device, a transaction request with a first effort-based identity token associated with the first user and a first user effort;

receiving a response with the first effort-based identity token and a first effort validation key obtained from a validation server via the second input device based on a second effort-based identity token associated with the second user and a second user effort;

providing the second user effort and second effort-based identity token to the validation server;

receiving a second effort validation key from the validation server; and sending the transaction with the first and second effort-based identity tokens and the first and second effort validation keys to the second user to complete the transaction while ensuring both the first and second users are consistent throughout the transaction.

17. The machine-readable storage device of claim 16, wherein the first and second user efforts comprise at least one of user device keyboard user efforts and gestures associated with user device touch screen user interaction.

18. The machine-readable storage device of claim 16, wherein the response includes the first effort validation key having both rendered Boolean match conclusion and statistics about calculations of the first effort validation key, as well as information about a challenge.

19. The machine-readable storage device of claim 16, wherein the transaction is sent without revealing personal identifying information.

20. The machine-readable storage device of claim 16, wherein the operations further comprise using the first and second effort-based identity tokens for additional transactions, ensuring both users remain the same for transactions.

* * * * *